United States Patent [19]

Mizoguchi

[11] Patent Number: 5,123,663
[45] Date of Patent: Jun. 23, 1992

[54] METHOD OF DETERMINING MINIMUM NUMBER OF SEGMENTS FOR COLLET FOR CUTTING TOOL HOLDER

[75] Inventor: Haruki Mizoguchi, Ikoma, Japan

[73] Assignee: Mizoguchi Iron Works & Co., Ikoma, Japan

[21] Appl. No.: 769,500

[22] Filed: Oct. 1, 1991

Related U.S. Application Data

[63] Continuation of Ser. No. 459,835, Jan. 18, 1990, abandoned.

[30] Foreign Application Priority Data

May 23, 1988 [JP] Japan .............................. 63-126801

[51] Int. Cl.⁵ ............................................. B23B 31/20
[52] U.S. Cl. .................................... 279/46.3; 279/142
[58] Field of Search .................. 279/1 R, 41 R, 46 R, 279/47-51

[56] References Cited

U.S. PATENT DOCUMENTS 3,246,903  4/1966  Sattler ...................................  279/47
3,583,714  6/1971  Weltzer et al. ...............  279/1 DC X

FOREIGN PATENT DOCUMENTS 205709  12/1986  Japan .

*Primary Examiner*—Steven C. Bishop
*Attorney, Agent, or Firm*—Wenderoth, Lind & Ponack

[57] ABSTRACT

A method of determining the minimum number of segments of a metal collet for a cutting tool holder having a truncated conical portion having a small-diameter end and a cylindrical portion connected to the small-diameter end. The collet is formed with slits extending axially inwards from the opening thereof for inserting a cutting tool and arranged at equal angular intervals. The slits extend to the cylindrical portion. The minimum number of segments is determined to be within the range where the geometrical moment of inertia of the section with respect to a line which passes through the centroid of the section and is perpendicular to a radical direction of the collet, as plotted against the number of segments, becomes substantially constant. With this arrangement, each segment has a suitable deflectability so that the collet can grip a cutting tool with sufficient force and accuracy and over a wide chucking range.

1 Claim, 4 Drawing Sheets

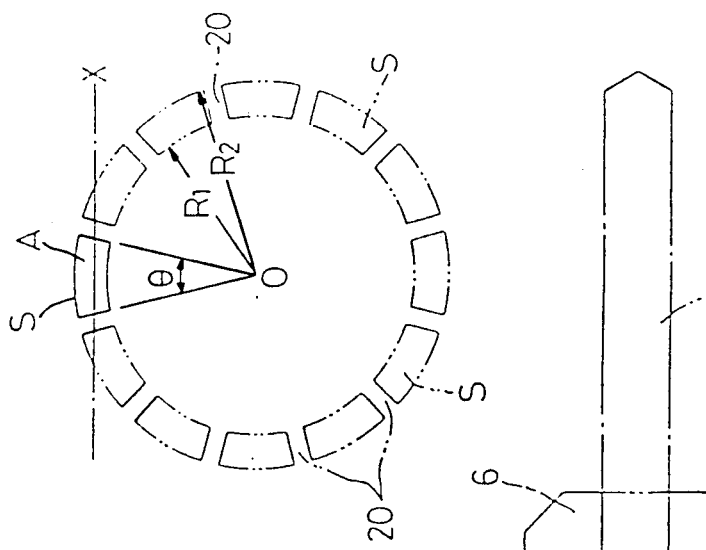
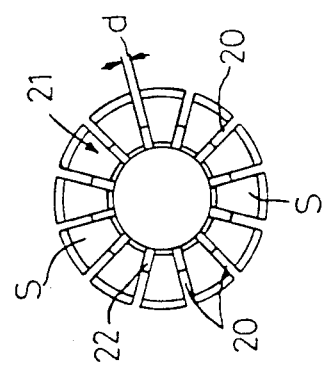
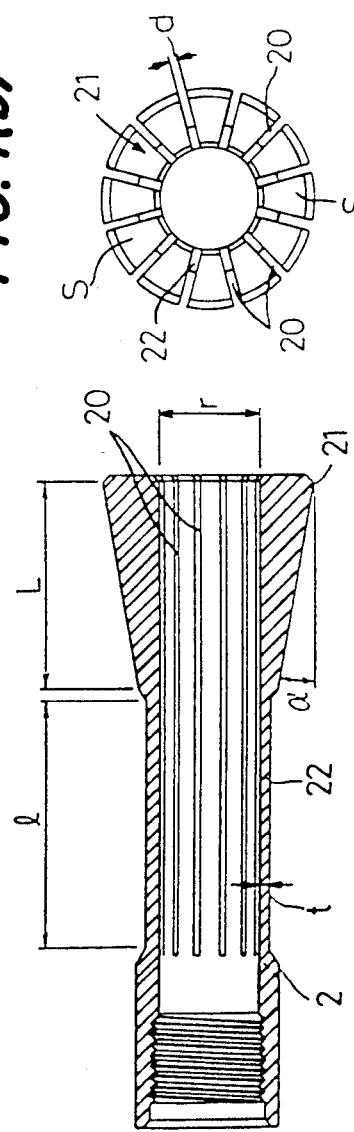
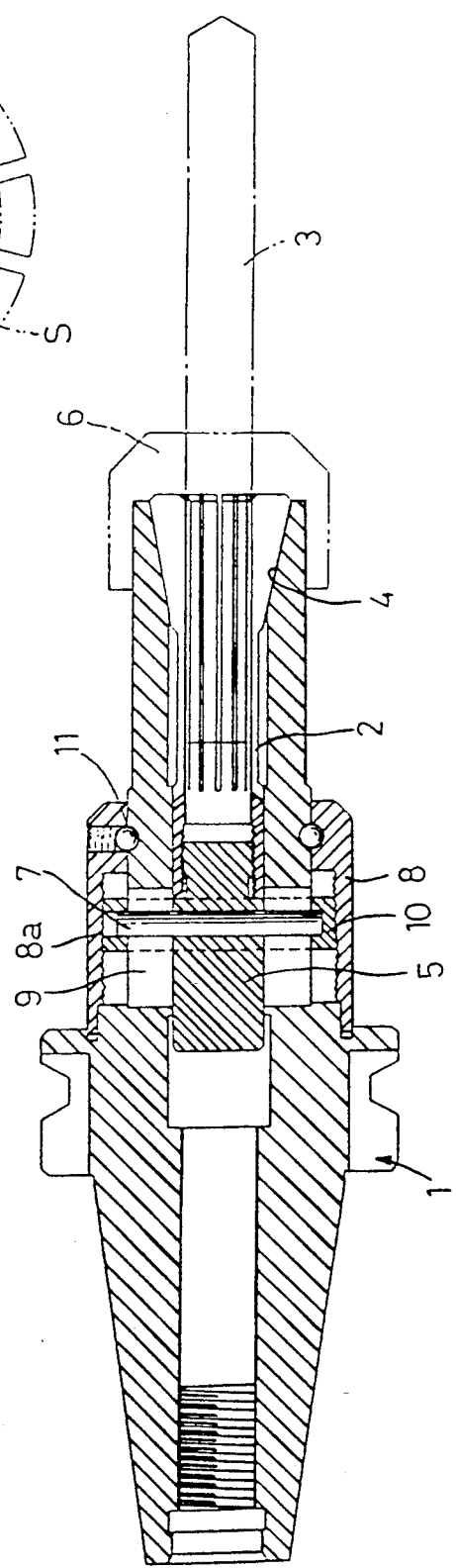

METHOD OF DETERMINING MINIMUM NUMBER OF SEGMENTS FOR COLLET FOR CUTTING TOOL HOLDER

This application is a continuation of now abandoned application, Ser. No. 07/459,835 filed on Jan. 18, 1990.

TECHNICAL FIELD

The present invention relates to a collet for a cutting tool holder and more particularly to a method of determining the minimum number of segments thereof which is capable of holding a cutting tool with sufficient force and accuracy and with a wider chucking range.

BACKGROUND ART

As shown in FIG. 2, a prior art holder for an end mill, a drill and other cutting tools for drilling and boring comprises a holder body 1 which can be inserted in a spindle of a machine tool and a collet 2 inserted in the body 1 so as to be aligned with its axis. After inserting a cutting tool 3 into the collet 2, the collet is pulled backwards along a tapered portion 4, so that its diameter will be reduced so as to chuck the cutting tool 3.

As means for moving the collet 2 back and forth, it is known (a) to draw a drawing screw 5 in threaded engagement with the collet 2 by means of a rod from the side of the machine tool (direct drawing method), (b) to screw a locknut 6 on the holder body 1 as shown by chain lines and tighten it and (c) to move a pin 7 extending transversely through the drawing screw 5 in an axial direction by turning a clamping collar 8, as shown by solid lines in FIG. 2.

In the drawing, numeral 9 designates through holes in the holder body 1 through which the pin 7 extends. They have a width (in the circumferential direction of the body 1) which is equal to the diameter of the pin 7 and have a predetermined length (in the axial direction of the body 1). The pin 7 is received in the through holes 9 so as to be movable axially but not circumferentially with respect to the holder. Numeral 10 designates a screw ring in which the pin 7 is fitted. The screw ring 10 is in threaded engagement with female threads 8a on the clamping collar 8. As the clamping collar 8 is turned, the pin 7 is moved right and left by the screw ring 10. Numeral 11 designates a bearing.

A spring collet 2a as shown in FIGS. 7a and 7b is chiefly used with the above described collet for moving method (c). It is formed with slits 20 extending from both end faces thereof. It can hold a cutting tool with sufficient force and accuracy (degree of runout of the cutting tool being chucked).

But when this collet 2a is pulled to reduce its diameter, its segments $2a_1$ and $2a_2$ divided by respective slits 20 so as to be connected with each other at their front ends will undergo at their front ends a shrinking force $F_1$ in the direction of the arrows in FIG. 8a. On the other hand, the segments $2a_1$ and $2a_2$, which are connected with each other at their rear ends, will undergo at their rear ends a shrinking force $F_2$ in the direction of the arrows in FIG. 8b. In other words, the clamping forces $F_1$ and $F_2$, which differ in direction from each other, act on the segment $2a_1$ at its front and rear ends, respectively. This will cause the segment $2a_1$ to be twisted in the direction of its length. All the segments $2a_1$ to $2a_8$ will be subjected to the same kind of twist.

The rate of twist increases with an increase in the shrinkage of diameter. The larger the rate of twist, the more the accuracy will decrease. Thus with this type of collet 2a, it is necessary to set the shrinkage rate (rate of reduction in diameter) at about 0.2 mm in order to give a satisfactorily accurate finish in end milling by use of the cutting tool 3.

The abovementioned problem could be solved by increasing the number of slits. But the structure is limited to 16 slits (8 slits extending from each end) in view of the strength of the entire collet.

FIG. 9 shows a collet 2b which is mainly employed with the moving methods (a) and (b). It comprises a trucated conical portion 21 and a cylindrical portion 22 integral with each other at the small-diameter end of the portion 21. The collet 2b is formed with a plurality of slits 20 arranged at equal angular intervals from one another and extending axially and inwardly from the tool receiving opening a for inserting a cutting tool 3. The number of slits 20 is usually 3, 4 or 6.

But if this collet 2b is used to chuck a cutting tool 3 having a diameter considerably smaller than the inner diameter of the collet 2b as shown in FIG. 10, there will be a gap between the inner surface of the truncated conical portion 21 and the outer surface of the cutting tool 3 as shown in FIG. 10b. This makes it difficult to grip the cutting tool with sufficient force and accuracy. Thus if the collet 2b is used for end milling, the shrinkage rate has to be limited to about 0.2 mm in order to give a satisfactory finish.

FIG. 11 shows another known collet 2c having a plurality of segments S which are not connected with the adjacent ones as with the collets 2a and 2b. Instead, they are bound together by means of synthetic resin c. But the use of synthetic resin c will lower the accuracy of chucking.

It is an object of the present invention to provde a method of determining a minimum mumber of segments for a collet which in view of the abovesaid shortcomings, can grip a cutting tool with sufficient force and accuracy and over a large range of tool diameters.

DISCLOSURE OF THE INVENTION

The present inventors have found that if an additional force F is applied to a collet such as the collet 2b or 2 when it is in the condition shown in FIG. 10b, it moves to the condition shown in FIG. 10c. In this state, the cylindrical portion 22 will be curved so that the truncated conical portion 21 will come into close contact at its tapered portion with the inner surface of the holder body 1. This improves the accuracy of chucking.

How much the cylindrical portion 22 bends depends largely on its rigidity. The rigidity is thought to be determined by the wall thickness of the cylindrical portion 22, the length of the slits 20 in the cylindrical portion 22, etc. The wall thickness is limited by the pull-in (pull-up) force and thus cannot be reduced beyond a permissible level. The length of the cylindrical portion 22 is determined by the length of the holder body 1 and by the means for reducing the diameter of the collet and thus cannot be increased more than necessary. In other words, the wall thickness and the length of the cylindrical portion 22 are determined by the holder body 1 itself.

As shown in FIG. 1, the present inventors prepared various collets having cylindrical portions 22 divided into different numbers of segments S having different thickness t from one another and different circumferentially extending cross-sections A around the central angle $\Theta$ around the axis 0 of each collet. As a result, they found the range of central angle $\theta$ where the geometrical moment of inertia of the section A is constant with respect to the line X which passes through the centroid of the section and is perpendicular to a radial direction of the collet. Such a range was found to be less than 30 degrees ($\pm 5$ degrees) irrespective of the thickness t.

It was found that the state shown in FIG. 10c can be attained by setting the central angle $\theta$ within the abovedescribed range while taking into consideration the length of the slits 20 in the cylindrical portion 22.

As shown in FIG. 5, from the relationship between the geometrical moment of inertia I of each segment S multiplied by the number of segments, that is, the geometrical moment of inertia $I_t$ of the entire cylindrical portion 22 and the central angle $\theta$ of each segment, no reduction in the $I_t$ value was observed where the central angle $\theta$ is approximately 30 degrees or less. This means that once the central angle of about 30 degrees is attained, any further division of the cylindrical portion 22 to increase the number of segments will only increase the number of manufacturing steps and lower the tensile strength of the cylindrical portion 22 and will not serve to lower the rigidity thereof, in other words, will not substantially, change the state shown in FIG. 10c, which means that for the collets with the size of segments as indicated, the number of segments is the minimum number needed. The curves in FIGS. 4 and 5 represented by the same numerals 1 to 3 show the results of tests conducted under the same conditions.

According to the present invention, each segment S separated by the slits 20 has a section A having a central angle $\theta$ at the axis of the collet and having a size (1) as described below.

(1) the maximum value within the range where the geometrical moment of inertia I of the section A is constant with respect to the line X which passes the centroid of the section A and is perpendicular to a radial direction of the collet.

With the collet 2 shown in FIG. 1 formed with slits 20 having a uniform width over the whole length thereof, the number of segments S divided by the slits 20 is set at (the number of segments S determined by the above size (1)$\pm$2.

As is apparent from FIG. 4, if the number of segments is less than the above-described range, the I value will increase sharply, which is not desirable from the viewpoint of rigidity. If it is greater than the above range, the drop in the rate of rigidity will slow down and thus dividing further will have no effect. Furthermore, this will reduce the strength to an unacceptable level and increase the number of manufacturing steps. Thus, the determined range is the minimum number of segments needed for the desired characteristics.

The collet 2 shown in FIG. 1 formed with slits 20 having a uniform width over the whole length should preferably have 12 segments divided by the slits 20. This is because, as is apparent from FIG. 4, dividing the collet into 12 segments will be the nearest to the size determined by the size (1).

The I value is given by the following formula:

$$I = \tfrac{1}{4}(R_2^4 - R_1^4)\{\theta + \tfrac{1}{2}\sin 2\theta\} - \tfrac{4}{9} \cdot \frac{(R_2^3 - R_1^3)^2}{R_2^2 - R_1^2} \times \frac{\sin^2\theta}{\theta}$$

wherein
$R_1$: Internal diameter of the cylindrical portion 22.
$R_2$: External diameter of the same.
$t = R_1 - R_2$, and $\theta$ is the central angle (radian).

The collet provided with segments according to the method of the present invention can carry out a satisfactory finish by end milling even if the rate of shrinkage is more than 2.00 mm, by setting the number of segments forming the cylindrical portion to the minimum number for the geometrical moment of inertia of the section of each segment.

Since the rate of diameter shrinkage is large, cutting tools such as end mills and drills having different diameters can be chucked with a smaller number of collets.

Also for easy machining and higher machining accuracy, the internal diameter of the truncated conical portion should preferaly be as large as possible. If the shrinkage rate of diameter is sufficiently large, the collet can be machined to a larger internal diameter than the diameter desired because the diameter can be reduced to the desired diameter when the collet is actually used. For example, if the desired diameter is 4 mm, the collet may be machined to an internal diameter of 6 mm.

BRIEF DESCRIPTION OF THE DRAWINGS

FIG. 1a is a sectional view of one embodiment of the collet according to the present invention;

FIG. 1b is a right end view of FIG. 1a;

FIG. 2 is a sectional view of a prior art holder showing a collet like that of FIG. 1 is mounted on a holder;

FIG. 3 is a sectional view of the cylindrical portion of the collet of FIG. 1;

FIG. 7b is a right end view of the collet of FIG. 7a;

BEST MODE FOR EMBODYING THE INVENTION

Now the present invention will be described in detail with reference to the accompanying drawings.

EMBODIMENTS

Collets 2 as shown in FIG. 1 and having the following dimensions were made.
Material: 9 kinds of spring steel (sup 9)
Angle $\alpha$ of the tapered surface on the truncated conical portion 21: 10 degrees
Internal diameter $\gamma$ of the truncated conical portion 21: 6 mm, 8 mm, 10 mm and 12 mm
Length l of the cylindrical portion 22: 24 mm and 30 mm
Thickness t of the cylindrical portion 22: 1.25 mm
Number of slits 20: 12
Width d of slits 20: 0.75 mm The relation between the internal diameter γ and the length L of the truncated conical portion 21 is as follows:

| γ mm | 6 | 8 | 10 | 12 |
|---|---|---|---|---|
| L mm | 24 | 24 | 24 | 24 |

Figure 5:
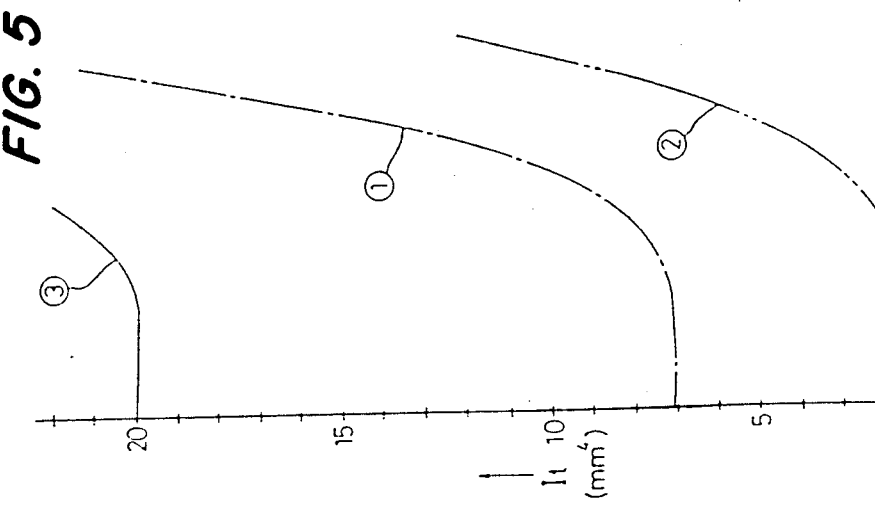
FIGS. 4 and 5 are graphs showing the relationship between the central angle of each segment and the geometrical moment of inertia of its section.
Figure 4:
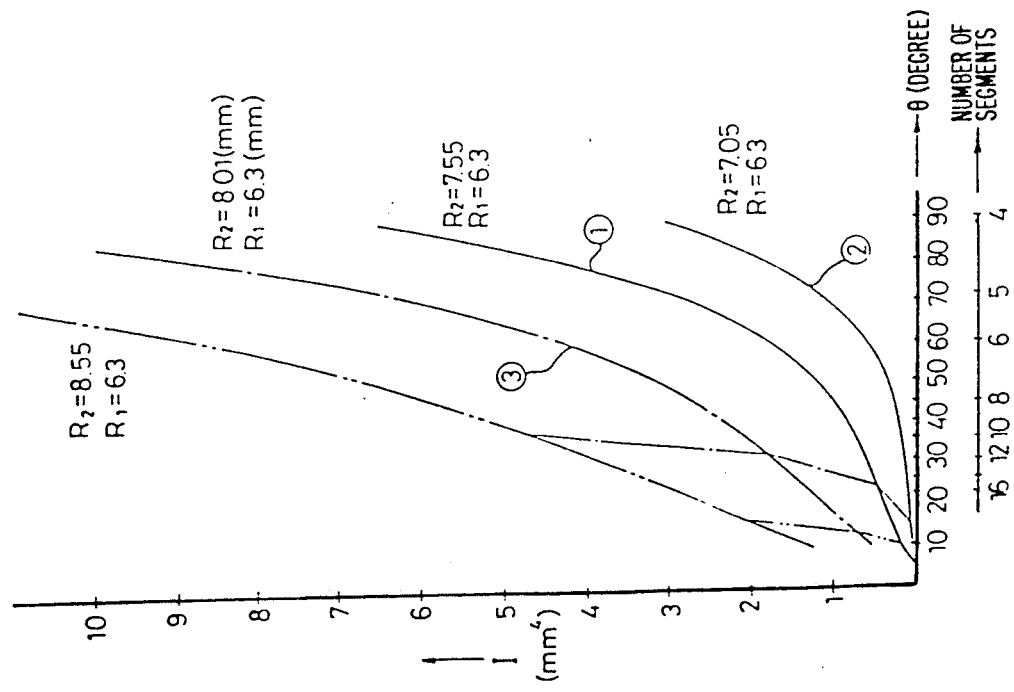
Figure 6:
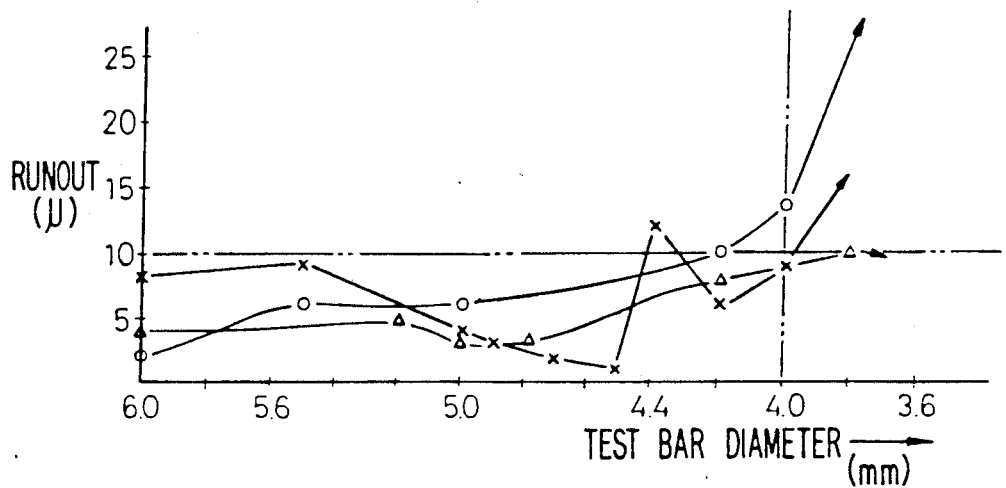
FIG. 6 is a graph showing the runout at the end.
Figure 7A:
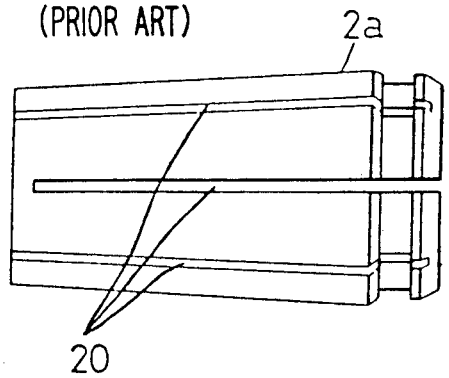
FIG. 7a is a side elevation view of a prior art collet.
Figure 7B:
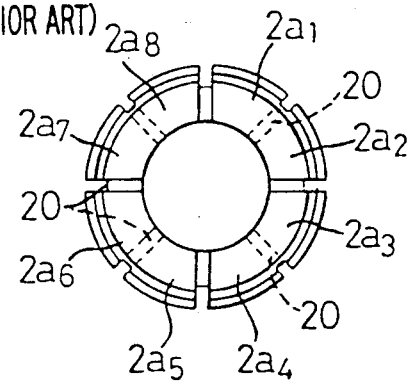
Figure 8A:
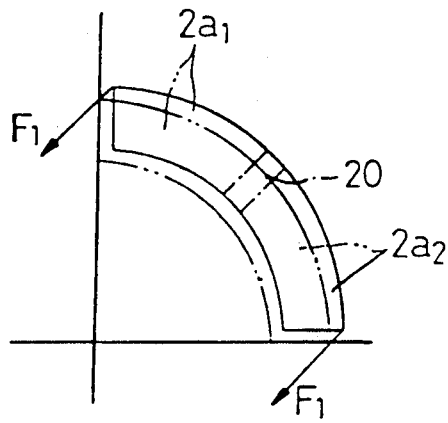
FIGS. 8a and 8b are views showing how the prior art example shown in FIG. 7 operates.
Figure 8B:
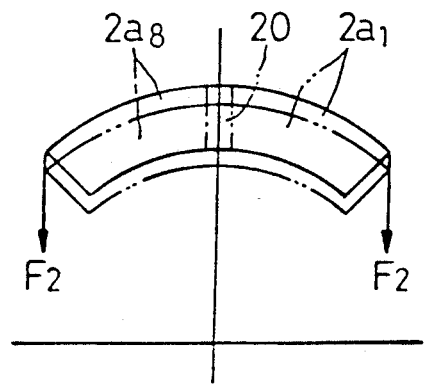
Figure 9:
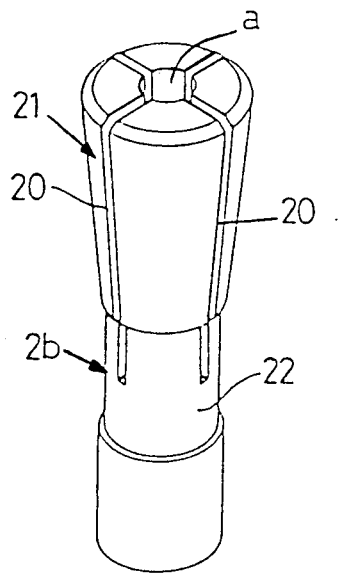
FIGS. 9 and 11 are perspective views of other prior art collets.
Figure 11:
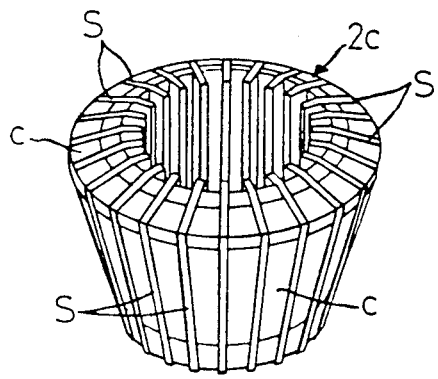
Figure 10A:
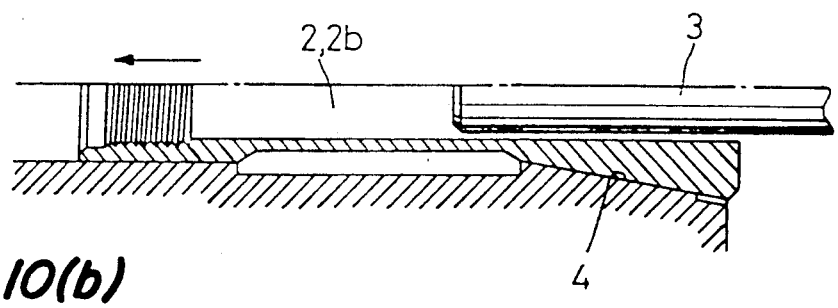
FIGS. 10a to 10c are views showing how collets and cutting tools are tightened.
Figure 10B:
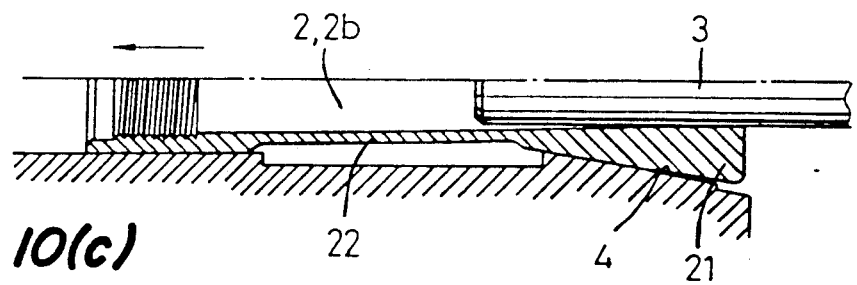
Figure 10C:
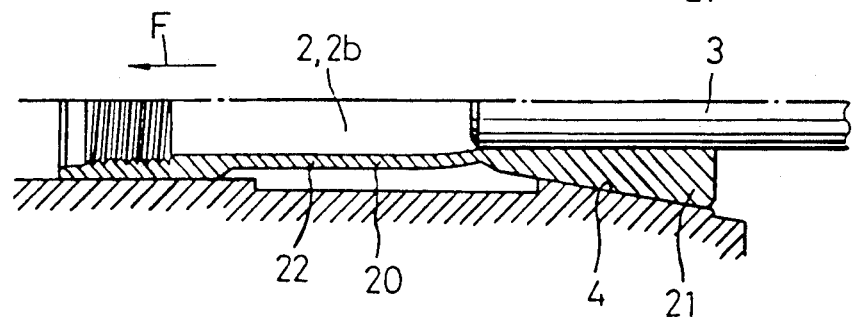

Among the above-described collets 2, the one having the value γ of 6 mm and the value l of 24 cm was inserted in the holder shown in FIG. 2 to chuck test bars having diameters decreasing from 6 mm by increments of 0.2 mm. The runout of each test bar was checked at a point apart from the end of the holder by a distance 5 times the diameter of the test bar. The results are shown in FIG. 6. Three specimens were used in this test.

The results show that the runout of the test bars having diameters within the range of 6–4 mm was less than 15 microns and thus the machining accuracy was satisfactory. The rate of shrinkage of diameter was 2.0 mm.

Test bars of different dimensions were put to similar test and similar results were obtained.

In the embodiment, the slits 20 had a width d of 0.75 mm and correspondingly the central angle θ for each segment was 25-26 degrees. If the thickness t is large, the length l should be determined taking into consideration the thickness t (rigidity is inversely proportional to l). The angle of taper α is not limited to 10 degrees but should be as small as possible.

I claim:

1. A method of determining the minimum number of segments of a collet at which the collet is able to grip different diameter cutting tools with a sufficient gripping force over a large range of tool diameters, the collet having a truncated conical portion and a cylindrical portion divided by a plurality of slits therin parallel to the axis of the collet into segments having a predetermined length and a predetermined radial thickness sufficient for being able to withstand a predetermined pull-in force on the collet; the method comprising:

determining the minimum angle $\Theta$ subtended by a segment less than which the total of the geometrical moments of inertial of the cross-sections of all of the segments in the cylindrical portion, all of which have the same cross-section, does not substantially change, the moment of inertia of the respective sections being the moment of inertial about an axis through the centroid of the cross-sectional area of the respective segment in the cylindrical portion and perpendicular to a radius of the collet through the centroid; and establishing the minimum number as the nearest whole number to $360°/\Theta(\pm 2)$.

* * * * *